(12) United States Patent
Russinovich et al.

(10) Patent No.: US 9,851,991 B2
(45) Date of Patent: *Dec. 26, 2017

(54) ISOLATION OF VIRTUAL MACHINE I/O IN MULTI-DISK HOSTS

(71) Applicant: MICROSOFT TECHNOLOGY LICENSING, LLC, Redmond, WA (US)

(72) Inventors: Mark Russinovich, Clyde Hill, WA (US); Naga Govindaraju, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/731,116

(22) Filed: Jun. 4, 2015

(65) Prior Publication Data

US 2015/0268980 A1 Sep. 24, 2015

Related U.S. Application Data

(63) Continuation of application No. 13/150,996, filed on Jun. 1, 2011, now Pat. No. 9,069,467.

(51) Int. Cl.
*G06F 9/455* (2006.01)
*G06F 3/06* (2006.01)

(52) U.S. Cl.
CPC ........ *G06F 9/45533* (2013.01); *G06F 3/0605* (2013.01); *G06F 3/0664* (2013.01); *G06F 3/0689* (2013.01)

(58) Field of Classification Search
None
See application file for complete search history.

(56) References Cited

U.S. PATENT DOCUMENTS

| 5,129,088 A | 7/1992 | Auslander |
| 5,446,855 A | 8/1995 | Dang et al. |
| 5,455,926 A | 10/1995 | Keele et al. |
| 5,615,352 A | 3/1997 | Jacobson et al. |

(Continued)

FOREIGN PATENT DOCUMENTS

| CN | 101419534 A | 4/2009 |
| WO | 2010022099 A1 | 2/2010 |
| WO | 2010022099 A2 | 2/2010 |

OTHER PUBLICATIONS

"First Search Report Issued in Chinese Patent Application No. 201280026484.6", dated Jun. 16, 2015, 4 Pages.

(Continued)

*Primary Examiner* — Kenneth Tang
(74) *Attorney, Agent, or Firm* — Shook, Hardy & Bacon L.L.P.

(57) ABSTRACT

Embodiments of the present invention relate to systems, methods, and computer storage media for concurrently maintaining a spanned virtual hard drive across two or more computer-storage media and a non-spanned virtual hard drive on one of computer-storage media. The method includes storing data of the spanned virtual hard drive across the computer-storage media utilizing volume spanning. While the spanned virtual hard drive is maintained on the computer storage media, the method includes storing data of the non-spanned virtual hard drive on one of the computer-storage media.

19 Claims, 6 Drawing Sheets

(56) References Cited

U.S. PATENT DOCUMENTS

| | | | |
|---|---|---|---|
| 6,148,369 A | | 11/2000 | Ofer et al. |
| 6,976,136 B2 | | 12/2005 | Falik et al. |
| 7,596,654 B1 | | 9/2009 | Wong |
| 7,606,868 B1 | * | 10/2009 | Le ................... G06F 17/30067 707/999.01 |
| 8,015,354 B2 | | 9/2011 | Tsuji |
| 8,307,177 B2 | | 11/2012 | Prahlad et al. |
| 8,346,727 B1 | | 1/2013 | Chester et al. |
| 9,069,467 B2 | * | 6/2015 | Govindaraju ......... G06F 3/0605 |
| 2007/0043771 A1 | | 2/2007 | Ludwig et al. |
| 2007/0168396 A1 | * | 7/2007 | Adams ................. G06F 3/0607 |
| 2007/0179980 A1 | | 8/2007 | Liu et al. |
| 2009/0106493 A1 | | 4/2009 | Tsuji |
| 2010/0185587 A1 | * | 7/2010 | Lovinger .......... G06F 17/30079 707/660 |
| 2010/0281210 A1 | | 11/2010 | Pidapa |
| 2011/0047195 A1 | | 2/2011 | Le et al. |
| 2012/0036320 A1 | | 2/2012 | Krishnamurthy |
| 2012/0079320 A1 | | 3/2012 | Krishnamurthy |
| 2012/0110281 A1 | * | 5/2012 | Green ..................... G06F 3/062 711/154 |
| 2012/0311573 A1 | * | 12/2012 | Govindaraju ......... G06F 3/0605 718/1 |
| 2013/0080773 A1 | | 3/2013 | Lu et al. |

OTHER PUBLICATIONS

"First Office Action Issued in Chinese Patent Application No. 201280026484.6", dated Jul. 2, 2015, 12 Pages.

Anonymous: "Windows Server 2008—Virtual system drive is split between separate LUNs—Server Fault", Dec. 9, 2010, XP055141002, Retrieved from the Internet: URL:http://jserverfault.comjquestions/183817/virtual-system-drive-is-split-between-separate-luns, retrieved on Sep. 17, 2014, 2 pages.

Eric Tung: "VMware Fusion 201: Split vs. Monolithic Virtual Disks, VMware Fusion Blog—VMware Blogs", Nov. 17, 2008, XP055141021, Retrieved from the Internet: URL:http://blogs.vmware.com/teamfusion/2009/11/vmware-fusion-6.htm, retrieved on Sep. 17, 2008, 4 pages.

European Office Action dated Oct. 14, 2014 in Application No. 12792990.9, 1 page.

European Search Report dated Sep. 25, 2014 in Application No. 12792990.9, 8 pages.

Jin, Keren, "Deduplication on Virtual Machine Disk Images", Published on: Sep. 2010, 97 pages Available at: http://www.ssrc.ucsc.edu/Papers/ssrctr-10-01.pdf.

"VMware Virtual Machine File System: Technical Overview and Best Practices" Retrieved on: Apr. 4, 2011, 19 pages Available at: http://www.vmware.com/pdf/vmfs-best-practices-wp.pdf.

"Provisioning Hyper-V Virtual Machine in Hosting Environment", Published on: Sep. 3, 2008, 61 pages Available at: http://download.microsoft.com/download/A/2/F/A2F199C0-672E-44E6-BF1D-878E233C3F08/ProvisioningHyper-VVirtualMachineinHostingEnvironment.docx.

"VMFS : Virtual Machine File System ", Published on: Aug. 27, 2010, Available at: http://www2.isupportyou.net/2010/08/vmfs-virtual-machine-file-system.html.

Notification of Transmittal of the International Search Report and the Written Opinion of the International Searching Authority, or the Declaration, dated Dec. 27, 2012, 10 pages.

Non-Final Office Action dated Oct. 22, 2013 in U.S. Appl. No. 13/150,996, 13 pages.

Final Office Action dated Sep. 4, 2014 in U.S. Appl. No. 13/150,996, 12 pages.

Notice of Allowance dated Feb. 23, 2015 in U.S. Appl. No. 13/150,996, 10 pages.

\* cited by examiner

ISOLATION OF VIRTUAL MACHINE I/O IN MULTI-DISK HOSTS

CROSS-REFERENCE TO RELATED APPLICATIONS

This application is a continuation of, and claims priority to, U.S. application Ser. No. 13/150,996, filed Jun. 1, 2011, entitled "ISOLATION OF VIRTUAL MACHINE I/O IN MULTI-DISK HOSTS" which is herein incorporated by reference in its entirety.

BACKGROUND

Traditionally, a host of a virtual machine provides physical disks to store data accessible by the virtual machine. From the perspective of a host, the data appears as a file on the disks, but from a perspective of the virtual machine, the data appears as being maintained in a hard drive. This file is referred to as a virtual hard drive that is either maintained on a particular disk of the host or the virtual hard drive is spanned across a plurality of the host disks. Because virtual machines are implemented traditionally to leverage physical resources of a common host, there may be several virtual machines per host. Traditionally, on a given host, all of the virtual machines on a host are limited to an exclusive data structure configuration (e.g., all spanned or all non-spanned). The exclusivity of a particular type of data structure may prevent a possibility of I/O isolation variability, fault tolerance adjustments, and access adjustments.

SUMMARY

Embodiments of the present invention relate to systems, methods, and computer-storage media for concurrently maintaining a spanned virtual hard drive across two or more computer-storage media and a non-spanned virtual hard drive on one of computer-storage media. The method includes storing data of the spanned virtual hard drive across the computer-storage media utilizing volume spanning. While the spanned virtual hard drive is maintained on the computer storage media, the method includes storing data of the non-spanned virtual hard drive on one of the computer-storage media.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems, methods, and computer-storage media for concurrently maintaining a spanned virtual hard drive across two or more computer-storage media and a non-spanned virtual hard drive on one of computer-storage media. The method includes storing data of the spanned virtual hard drive across the computer-storage media utilizing volume spanning. While the spanned virtual hard drive is maintained on the computer storage media, the method includes storing data of the non-spanned virtual hard drive on one of the computer-storage media.

In another aspect, the present invention provides another method for concurrently maintaining both a spanned virtual hard drive across multiple disks and a non-spanned virtual hard drive on one of the disks. The method includes receiving a first request, such as an I/O request, for data of the spanned virtual hard drive. The method also recites directing the first request to the spanned virtual hard drive. The method also recites receiving a second request for data of the non-spanned virtual hard drive. Further, the method recites directing the second request to the disk maintain the non-spanned virtual hard drive. The non-spanned virtual hard drive and the spanned virtual hard drive are both accessible, at least in part, on a common disk concurrently.

A third aspect of the present invention provides a system for concurrently maintaining a spanned virtual hard drive across two or more disks and a non-spanned virtual hard drive on a first disk of the two or more disks. The system includes a host. The host is comprised of a virtual machine; a virtual hard drive driver; and a host file system. Additionally, the host is comprised of a first computer-storage medium maintaining both of at least a portion of a spanned virtual hard drive and the entirety of a non-spanned virtual hard drive. The host is also comprised of a second computer storage media maintaining at least a portion of the spanned virtual hard drive and it does not maintain the non-spanned virtual hard drive.

Having briefly described an overview of embodiments of the present invention, an exemplary operating environment suitable for implementing embodiments hereof is described below.

Figure 1:
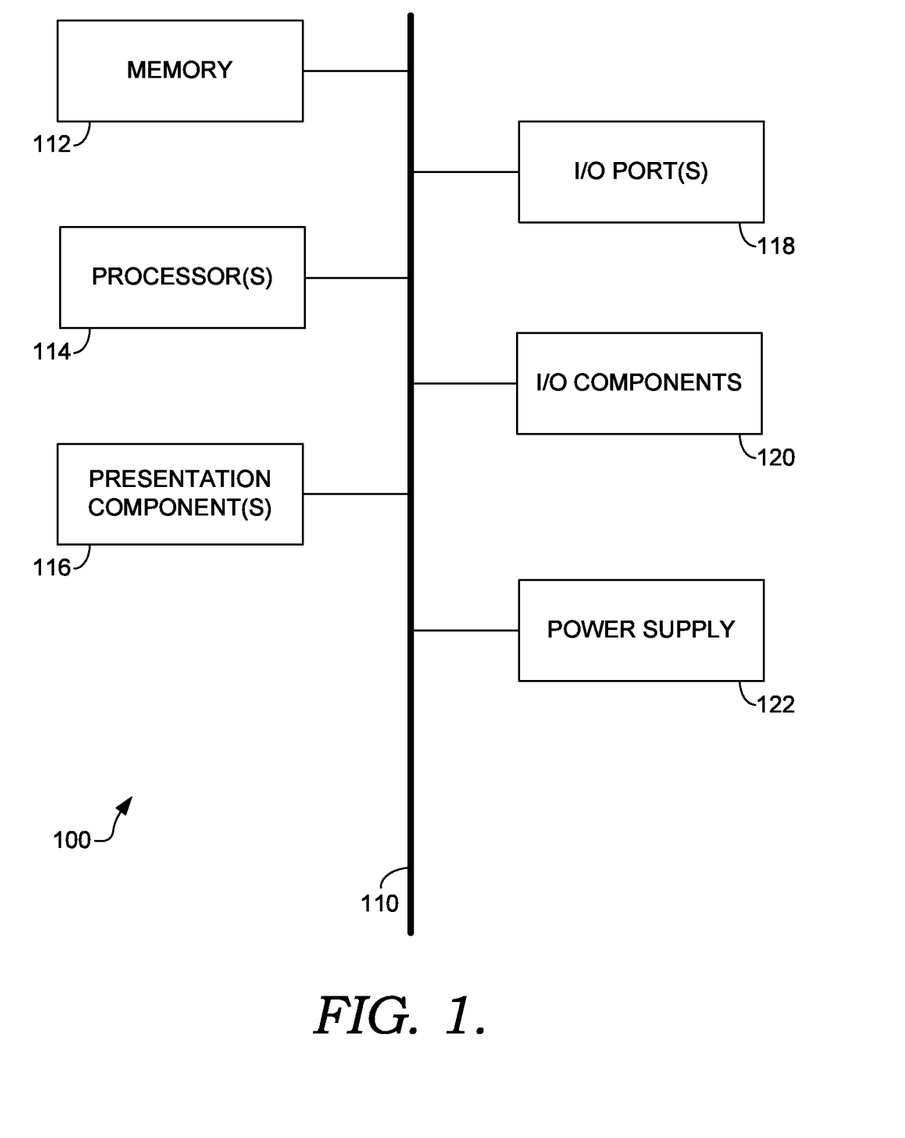
FIG. 1 depicts an exemplary computing device suitable for implementing embodiments of the present invention.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "blade," "node," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer-storage media ("CSM"), such as non-transitory computer-storage media, in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
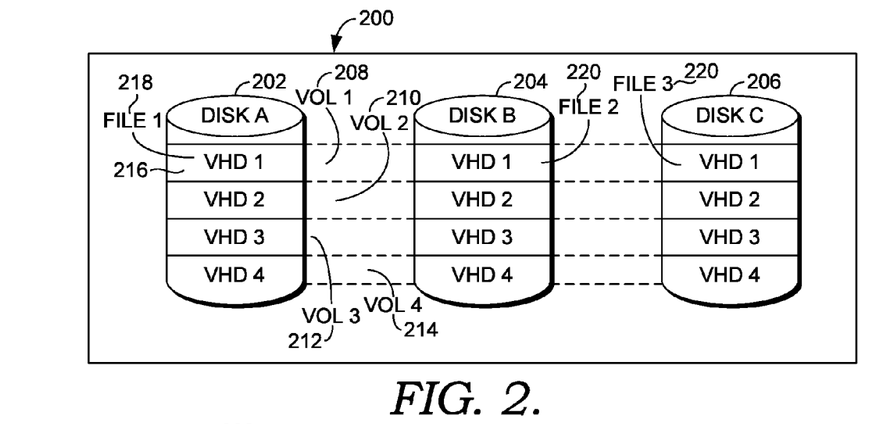
FIG. 2 depicts an exemplary node having a plurality of spanned disks, in accordance with embodiments of the present invention.

FIG. 2 depicts an exemplary node 200 having a plurality of CSM, in accordance with embodiments of the present invention. A node may be a computing device, such as the computing device 100 of FIG. 1. For example, a node may be a blade, a server, or other distributed storage component that is utilized for maintaining one or more portions of data that are accessible by way of a network.

It is understood that a node, such as the node 200, may be comprised of any number and/or type of CSM. For example, an exemplary node includes four discrete CSM, such as four physical hard drives. In an exemplary data storage structure, the first disk (disk 0) may be reserved for a root operating system ("OS"), such as for the host system and/or one or more virtual machines ("VM"). Continuing with this example, the remaining three CSM are reserved for guest container resource (e.g., a volume as perceived by a VM). This exemplary data storage structure configuration exposes a single volume that spans the three CSM, which is an example of volume spanning.

Spanning a volume across multiple CSM provides the appearance to a VM (or any layer at or above a hypervisor layer) that the three discrete CSM (or portions thereof) are a continuous volume. However, at the host level (e.g., from the hardware perspective) there are really three discrete CSM having multiple volumes. Therefore, the terminology used herein may change based on the perspective from which it is viewed. For example, a VM may perceive a VHD while a host may perceive the same data as a file (or volume, or partition). Additional examples will be discussed hereinafter with respect to FIG. 4.

Returning to FIG. 2, the node 200 includes a disk A 202, a disk B 204, and a disk C 206. Each of the disks 202-206 may be any form of CSM (e.g., volatile, non-volatile, RAM, optical, hard disk, and the like). The term "disk" is used herein as a generic terminology for CSM and is not intended to be limiting to a particular form of CSM. The disks 202-204, in node 200, are disks supporting volume spanning that allow for a volume/container to span across all of the disks. For example, a volume 1 208, a volume 2 210, a volume 3 212, and a volume 4 214 all span disks 202-206. From a hardware perspective, the volume 1 208 is three discrete files, a file 1 218, a file 2 220, and a file 3 222. However, from the VM perspective, the volume 1 208 is a continuous volume maintaining a virtual hard drive ("VHD"), such as a VHD 1 216. A VHD (also referred to as a virtual hard disk) is a virtual hard disk file format that is able to contain what is found on a physical hard disk drive (e.g., CSM), such as disk partitions and a file system. A VHD is typically used as a "hard disk" for a VM. Therefore, just like a physical computing device may use a physical hard disk, a VM may similarly use a VHD.

While FIG. 2 does not explicitly depict other components (e.g., processor, communication components, power supply, and the like) it is understood that such components are contemplated and are traditional to a computing device, such as that discussed with respect to FIG. 1. Therefore, FIG. 2 (and the additional figures of the present application) are illustrated in a manner to convey particular information, but it is understood that additional components, steps, and items may (and likely are) contemplated herein. Further, while FIG. 2 depicts a stripping-type data storage configuration, it is understood that any volume spanning configuration is contemplated and may therefore be utilized in connection with embodiments of the present invention. For example, a first volume and a second volume may utilize a first partition on a first CSM while the first volume and the second volume also utilize a second partition on a second CSM. In this example, the first volume spans the first CSM and the second CSM while sharing a common partition in the first CSM with the second volume. It is contemplated that the foregoing is an example and additional arrangements are contemplated.

Figure 3:
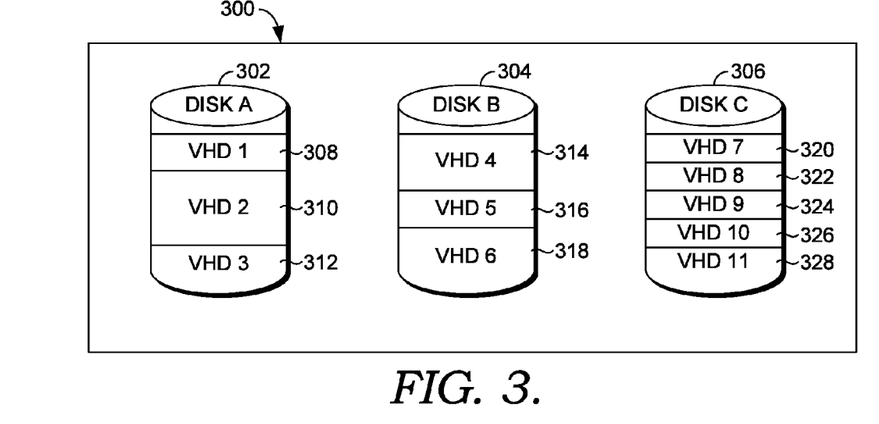
FIG. 3 depicts an exemplary node having a plurality of discrete disks, in accordance with embodiments of the present invention.

FIG. 3 depicts a node 300 having a plurality of CSM, in accordance with embodiments of the present invention. The node 300 has a disk A 302, a disk B 304, and a disk C 306. However, unlike the node 200 of FIG. 2, the node 300 does not utilize spanning. Consequently, in the node 300, each VHD is confined to a discrete disk. The node 300 is comprised of a plurality of VHD's 308-328, each of which does not span multiple physical disks.

The structure utilized in the node 200 of FIG. 2 and the structure used in the node 300 of FIG. 3 are, however, similar in that they both implement an exclusive storage solution across two or more disks of the node. In the case of FIG. 2, the two or more disks are exclusively structured with spanning (e.g., volume spanning). FIG. 3 provides two or more disks that exclusively implement discrete disk utilization by a VHD (e.g., each VHD is limited to a particular physical disk). A "just a bunch of disks" ("JBOD") configuration is an example of that which is illustrated in FIG. 3.

The configuration of FIG. 2 allows for the largest possible container to be stored. Additionally, the storage abstraction of FIG. 2 simplifies the allocation of container resources across the disks without active management of container files on individual disks. However, the configuration of FIG. 2 may have shortcoming as well. If one of the three disks (in this example) fails, the data for the entire node 200 may be lost. This introduces a single point of failure at each of the disks. This increases the likelihood of data loss by a factor of the number of disks used divided by the number of disks individually required to store the same data. Additionally, an exclusively spanned solution does not provide input/output ("I/O") isolation. For example, intensive I/O operations of a VM on the spanned disks affects the response time for all other VMs utilizing the same disks. Consequently, the configuration of FIG. 2 provides efficiencies in file management and container size maintenance options; it also introduces fault and I/O isolation concerns.

The configuration provided by FIG. 3 provides a higher level of I/O isolation and fault tolerance. However, the size of a single container (e.g., portion of storage useable for a VHD) is limited to the size of a particular disk. Therefore, when a VM needs a storage container larger than any one single disk (or available space on a single disk), the configuration of FIG. 3 is ineffective.

Figure 4:
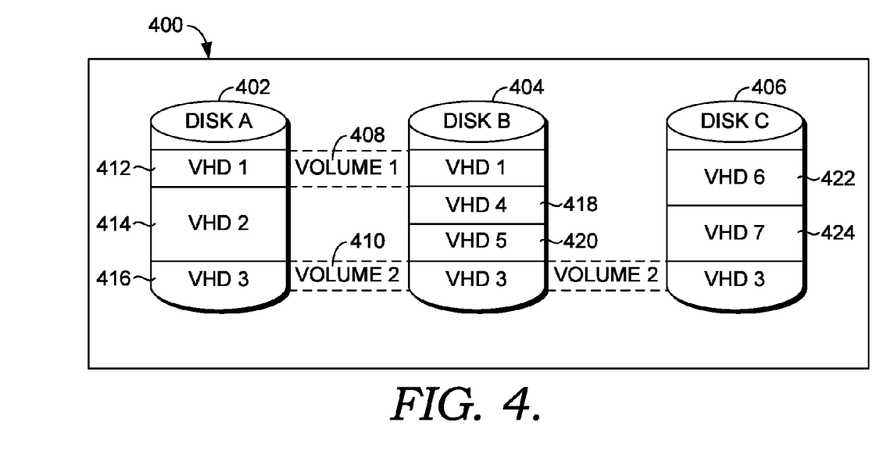
FIG. 4 depicts an exemplary node having a plurality of disks maintaining data in a hybrid data structure, in accordance with embodiments of the present invention.

As a result, to overcome the deficiencies of the configuration of FIG. 2 and the shortcomings of the configuration of FIG. 3, a dynamic and flexible configuration is desired. FIG. 4 depicts a hybrid storage configuration of a node 400 having a plurality of CSM, in accordance with embodiments of the present invention. The node 400 includes a disk A 402, a disk B 404, and a disk C 406. The storage solution provided in node 400 is not exclusively spanning nor is it exclusively discrete, instead, a combination of discrete, partial spanning, and/or complete spanning of CSM may be implemented.

For example, a VHD 1 412 is a partial span of the disk A 402 and the disk B 404 such that the VHD 1 412 resides in a container, as seen by a VM, as a volume 1 408. Similarly, a VHD 2 414, a VHD 4 418, a VHD 5 420, a VHD 6 422, and a VHD 7 424 are examples of a discrete storage solution, where the container in which each of these VHDs is contained is limited to a discrete physical disk. Further yet, a container containing a VHD 3 416 spans all of the accessible disks of the node 400, which is perceived by a VM as a volume 2 410.

The volume 1 408 spans two or more CSM without spanning all of the CSM within the node 400. The volume 2 410 spans all of the disks of the node 400. Therefore, in FIG. 4, an exemplary embodiment allows for previously exclusive storage solutions to coexist in a common node, which allows for the runtime or dynamic shifting from spanned to non-spanned for any of the resources used by a VM regardless of VM utilization criteria. As will be discussed hereinafter with respect to FIGS. 5 and 6, this is possible, at least in part for this exemplary embodiment, through the use of a VHD driver at a hypervisor layer and/or a VHD filter at a host file system layer.

In an exemplary embodiment, it is contemplated that a container containing resources for a VM expands based on need. Therefore, as the resources required increase, a container may be dynamically switched from a discrete container (e.g., VHD 2 414) to a partially spanned container (e.g., volume 1 408). Again, when the resources required grows beyond an additional threshold (e.g., available space on the currently used CSM, I/O request, etc.), the partially spanned container may then span additional disks (e.g., volume 2 410). Conversely, if the resources required by a VM diminish, the container may contract from a spanned or partially spanned container to a discrete container. Further, it is contemplated that at least one disk of a node is exclusively a discrete container, while two or more other disks of the node maintain spanned and/or partially spanned containers. Further, it is contemplated that a location (e.g., physical disk) onto which a container is maintained (for storage and access) is selectable by a client, a user, a hypervisor, and/or a hosts file system. The ability to select the allocation of containers (e.g., quantity, type, size) to one or more disks allows for a variety of optimizations to be discussed hereinafter. It is contemplated that any combination of containers, volumes, and/or VHDs may be implemented in embodiments of the present invention.

Returning to FIG. 4, depending on a perspective taken when discussing different portions/objects, they may be referred to by different names. For example, the VHD 2 414 may appear as a discrete file from the host level, but as hard disk (i.e., VHD) from the perspective of a VM. The volume 1 408 may be referred to as multiple spanned files from the host level, but as a VHD from the VM level. Therefore, in some embodiments, it may be helpful to refer to a portion of storage in a non-descript manner, such as a container.

Figure 5:
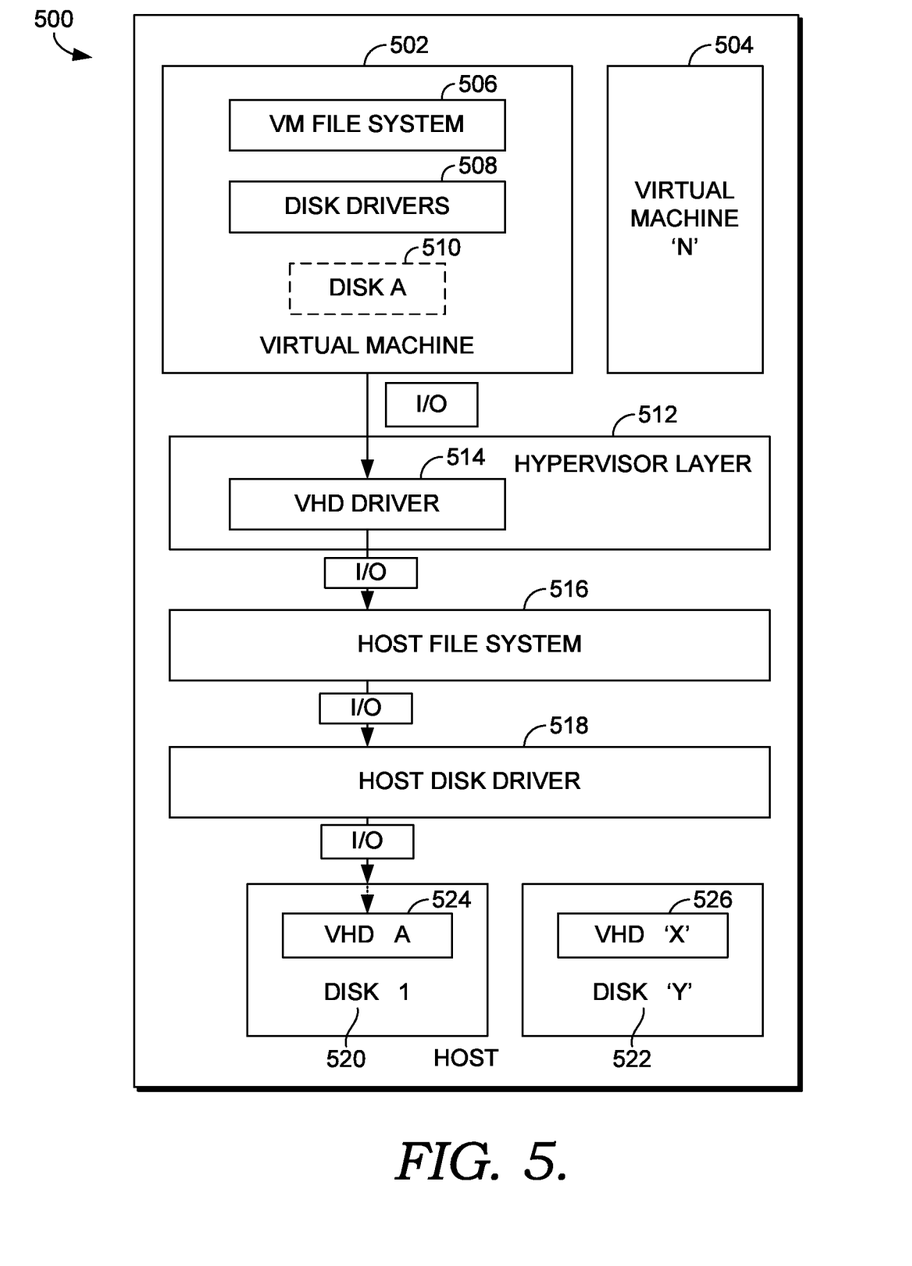
FIG. 5 depicts an exemplary host having a VHD driver at a hypervisor layer, in accordance with embodiments of the present invention.

FIG. 5 depicts an exemplary host 500, in accordance with embodiments of the present invention. A host in an exemplary embodiment is a computing device, such as the computing device 100 of FIG. 1. The term 'host' is used as the host hosts one or more 'guests,' which may include VMs. For example, the host 500 may support the operations of a virtual machine 502. Further, the host 500 may support additional virtual machines, such as a virtual machine N 504. A guest, such as a VM, utilizes resources of the host. For example, a VM may be a virtualized computing system that is embodied in the physical space of the host, leverages the host's resources, but appears to be independent of the host to an outside client. Therefore, a VM, in an exemplary embodiment, is a software implementation of a computing device that executes programs like a physical machine.

The VM 502 is comprised of a VM file system 506, a disk driver 508, and a disk A 510. The VM file system 506 is an operating system operating in a virtual environment. The disk driver 508 interface with VHDs, such as the disk A 510. However, the disk A 510 is merely a virtualized disk that actually is relying on CSM resources of the host 500, such as a disk 1 520 and a disk Y 522. The VM 502 perceives that the disk A 510 is a resident CSM, while in actuality it is a VHD being maintained by one or more CSM of the host.

A hypervisor layer 512 is an interface layer above a host file system 516 that supports VM access to resources of the underlying host. The hypervisor layer may support multiple virtual machines accessing common resource of the host. A VHD driver 514 will be discussed in detail hereinafter.

The host file system 516 is an OS layer for the host 500. The host file system 516 controls the physical components, connections, and processes of the host 500. In an exemplary embodiment to be discussed with respect to FIG. 6, the host file system may be comprised of a VHD filter.

A host disk driver 518 is a disk driver for the host 500 that allows for the interface of the host file system 516 and one or more CSM, such as the disk 1 520. In an exemplary embodiment, the host disk driver is a computing program that allows for a higher layer (e.g., host file system 516) to interact with one or more disks.

The disk 1 520 is an exemplary CSM of the host 500. In an exemplary embodiment, the disk 1 520 is one of four disks within the host 500. The disk 1 520, in this exemplary embodiment, maintains a file that is perceived by the VM 502 as a hard drive, a VHD A 524. Similarly, the disk Y 522 also contains a file that is perceived by a VM as a VHD X 526. While FIG. 5 depicts discrete VHDs (e.g., containers), it is contemplated that one or more spanned (or partially spanned) container may also be incorporated in a hybrid or an exclusive manner into the disk 1 520 and/or the disk Y 522.

It should be understood that FIG. 5s and other arrangements described herein are set forth only as examples. Other arrangements and elements (e.g., machines, interfaces, functions, orders, and grouping of functions, layers, levels, drivers, Oss, VMs, CSM, etc.) can be used in addition to or instead of those shown, and some elements may be omitted altogether. Further many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The components may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of hosts, servers, VMs, and CSM may be employed within a system within the scope of the present invention. Additionally other component not shown may also be included within the system.

Returning to FIG. 5, which illustrates the VM 502 communicating an I/O request to access data maintained on a CSM of the host 500. The I/O request is communicated from the VM 502 and received at the hypervisor layer 512. The I/O request is intercepted at the hypervisor layer 512 by the VHD driver 514.

The VHD driver 514 is a program that intercepts I/O requests to identify storage options. The storage options may include determining where requested data is stored (e.g., what container, what CSM of the host, what directory, etc.). The storage option may include determining where data should be stored (e.g., what container, what CSM of the host, what directory, etc.). The storage option may include determining how the data is stored (e.g., spanned, partially spanned, discrete). The storage option may include determining if the data should migrate (e.g., optimization of I/Os hitting a particular CSM, expansion of a container, contraction of a container, etc.).

In order to accomplish the functionality of the VHD driver 514, a metafile may be maintained for a VM. For example, a metafile may maintain an index of data storage locations, options, VHD type, and metrics associated with data access size, frequency, and the like. The metafile may be used by the VHD driver 514 to determine where particular data is stored, how it is stored, and if optimizations may be performed. Optimizations may include, for example, moving containers from one CSM to one or more other CSM to reduce I/Os to one or more CSM. Other optimizations may include reducing fault impact by reducing the number of containers residing on a particular CSM. Other optimizations may include reducing the number of CSM spanned by a container when the same sized container may be maintained on fewer CSM. Other optimizations are contemplated.

The metafile may be maintained in a particular location of a host for easy and efficient access. For example, the metafile may be maintained in a particular container of a particular CSM (e.g., first sector of disk 0). In the alternative, the metafile may be maintained at a location that is identified in a header or other portion of an I/O request, such that upon interpreting the I/O request, the location of a related metafile may be determined.

The VHD driver 514, in an exemplary embodiment, allows for the dynamic adjustment of storage structures in a runtime environment. For example, the process of intercepting I/O requests at the hypervisor layer 512 allows for the host 500 to dynamically adjust how data is stored on the disk 1 520 and the disk Y 522. This dynamic adjustment allows for discrete containers to reside on the same CSM as spanned container. The dynamic adjustment also allows for discrete containers (e.g., non-spanned VHD) to transition to a spanned container in a runtime environment. Advantageously, the VM 502 is allowed to process data concurrently while a container transitions from a spanned to a non-spanned state (or vice versa). Further, by allowing for the runtime allocation of storage, the CSM may be optimized in a host without reconfiguring the entire host. Consequently, utilization of the VHD driver 514 allows for I/O packets to be directed from the VM 502 to an appropriate CSM.

In this exemplary embodiment of FIG. 5, the I/O request is then directed through the host file system 516 and the host disk driver 518 to the VHD A 524 of the disk 1 520 based on the direction provided by the VHD driver 514. Had the I/O request been associated with data maintained at the VHD X 526, the VHD driver 514 could intercept that I/O request and redirect the I/O request to the disk Y 522.

Figure 6:
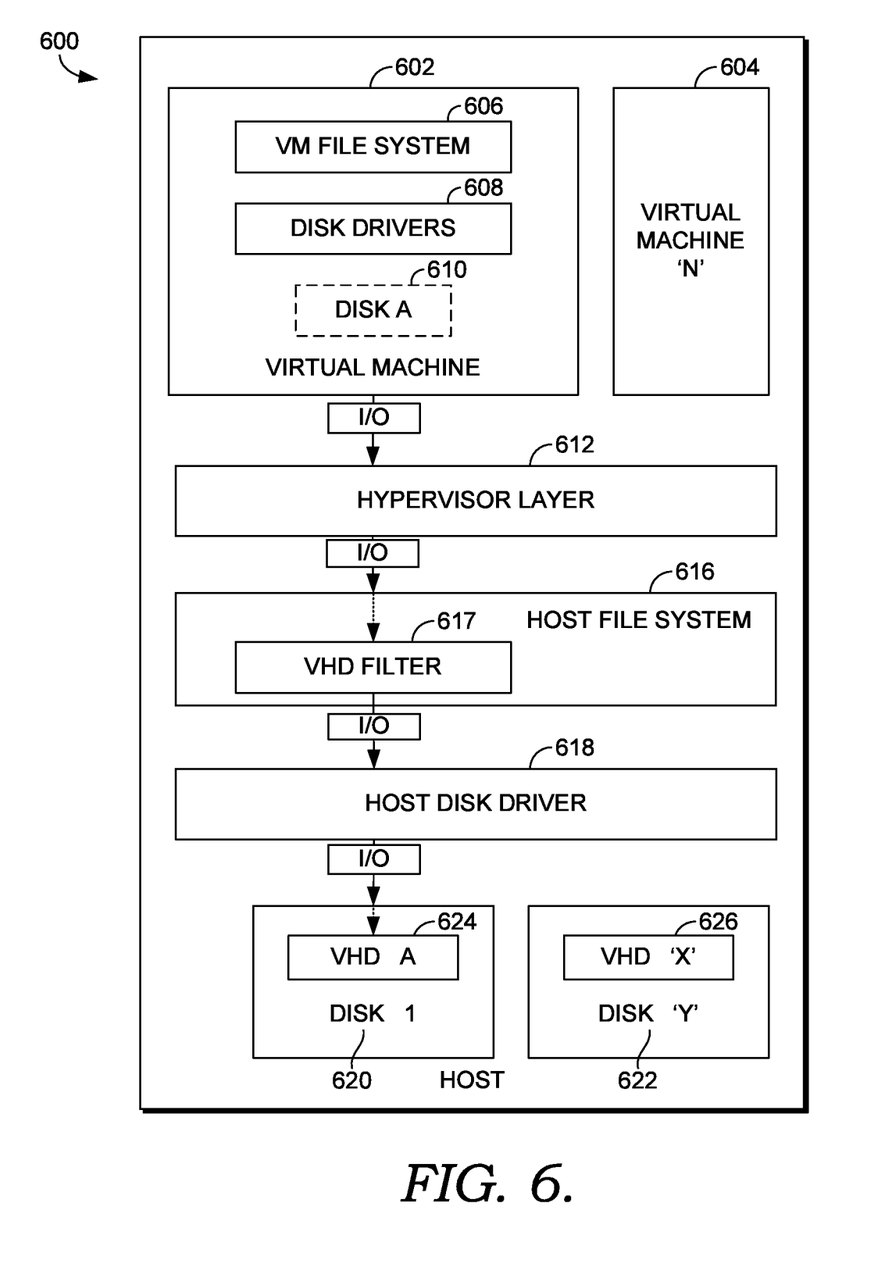
FIG. 6 depicts an exemplary host having a VHD filter at a host file system layer, in accordance with embodiments of the present invention.

FIG. 6 provides a host 600, in accordance with embodiments of the present invention. The various layers, driver, machines, CSM, and the like of the host 600 are comparable, in an exemplary embodiment, to similarly named items previously discussed with respect to the host 500 of FIG. 5. For example, the host 600 is comprised of a VM 602, a VM file system, 606, disk drivers 608, VM disk A 610, a virtual machine N 604, a hypervisor layer 612, a host file system 616, a VHD filter 617, a host disk driver 618, a disk 1 620, a disk Y 622, a VHD A 624, and a VHD X 626. As a result, those details discussed with respect to similarly named items of FIG. 5 will not be repeated with respect to FIG. 6. However, unlike the host 500 of FIG. 5, the host file system 616 is comprised of a VHD filter 617.

In an exemplary embodiment, the VHD filter 617 performs functions similar to those discussed hereinabove with respect to the VHD driver 514 of FIG. 5. However, instead of intercepting I/O packets at the hypervisor layer, the VHD filter instead intercepts I/O requests at the host file system 616. Consequently, the VHD filter 617 intercepts the I/O packets that are passed along from the hypervisor layer 612 instead of directly from the VMs, as was discussed with FIG. 5.

The VHD filter 617 also may access a metafile to identify information associated with the intercepted I/O packet. For example, the information associated with the intercepted I/O packet as identified from the metadata file may include a location, a CSM, a container, or the like at which the data correlated to the intercepted I/O is found. Additional information may include frequency of access for the data, a CSM, a container, or a VM to aid in making optimization determinations.

Once a packet is intercepted by the VHD filter 617, the packet is directed by the VHD filter 617 to an appropriate CSM, such as disk 1 620, in this example. It is contemplated that the VHD filter 617 is able to identify a location to which data for a VM is maintained, identify one or more containers to which the data is to be stored or accessed from, determine if a container is to be spanned or non-spanned, determine if one or more CSMs are more appropriate for maintaining at least a portion of the data (e.g., based on fault tolerance, I/O isolation, access time, and the like).

In an exemplary embodiment, it is advantageous to implement a VHD driver operating at a hypervisor to intercept I/O packets. For example, only those I/O packets originating from or destined to a VM pass through a hypervisor layer. Therefore, only those I/O packets are inspected or intercepted. This is opposed to a VHD filter intercepting I/O packets in a host file system, which may intercept I/O packets from (or to) components/applications other than a VM. In another exemplary embodiment, it is advantageous to implement a VHD filter to intercept I/O packet. For example, the V/HD filter may be incorporated within an OS that is regularly updated, allowing for the VHD filter to be more easily updated. Additional advantages are contemplated.

Figure 7:
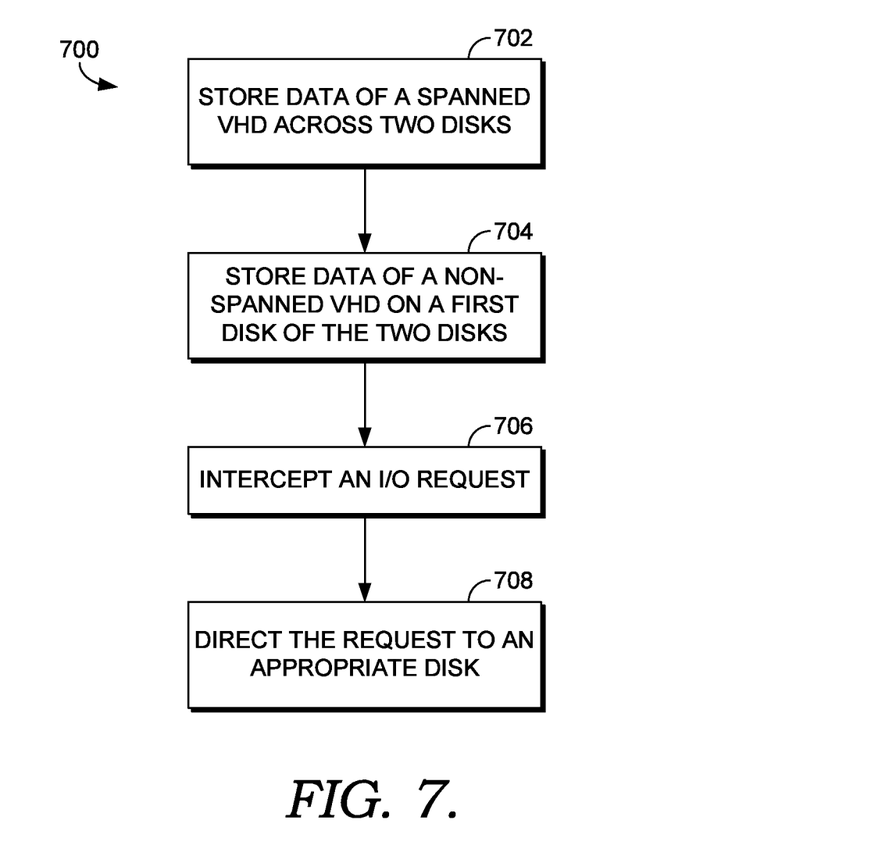
FIG. 7 depicts a method for concurrently maintaining a spanned hard virtual hard drive across two or more computer-storage media ("CSM") and a non-spanned virtual hard drive on a first CSM of the two or more CSM, in accordance with embodiments of the present invention.

FIG. 7 depicts a block diagram of a method 700 for concurrently maintaining a spanned hard virtual hard drive across two or more CSM and a non-spanned virtual hard drive on a first CSM of the two or more CSM, in accordance with embodiments of the present invention. A block 702 represents a step of storing data of the spanned VHD across two CSM. For example, the volume 1 408 of FIG. 4 spans the disk A 402 and the disk B 404, also of FIG. 4. The volume 1 408 is a container maintaining the VHD 1 412, which consequently spans the two disks. The data stored in a spanned VHD may be data of a VM utilizing the resources of the two (or more) CSM.

A VHD driver of a hypervisor layer may be responsible for storing and accessing data in the two or more CSM. In the alternative (or in combination), a VHD filter in a host file system may be responsible for storing and accessing data in the two or more CSM. In this exemplary embodiment, the two or more CSM are collocated in a common machine (e.g., server, blade, computing device). Also, in an exemplary embodiment, the two or more CSM that traditionally maintain data in an exclusive structure format (e.g., all spanned, all discrete), but are able, as a result of either a VHD driver or a VHD filter, to maintain a hybrid structure format.

At a block 704, data of a non-spanned VHD is stored on a first CSM of the two or more CSM from the block 702. In an exemplary embodiment, the data of the spanned VHD and the data of the non-spanned VHD are collocated, at least in part, on a common CSM concurrently. As a result, data of the spanned VHD and data of the non-spanned VHD are accessible from a common VHD substantially simultaneously. The term "substantially simultaneously" may account for a limitation of CSM, which may allow for only a single portion of data to be accessed/stored at any given time, but immediately after that read/write another portion of data may then be accessed, for example. The block 702 and the block 704, in an exemplary embodiment may allow for the VHD 1 412 and the VHD 2 414 of FIG. 4 to be maintained on the disk A 402.

At a block 706 an I/O request (e.g., a packet) is intercepted. As previously discussed either (or both) a VHD driver or a VHD filter may be implemented to intercept the I/O request.

At a block 708 the intercepted I/O request is directed to an appropriate CSM. For example, a VHD driver or a VHD filter may repackage the I/O request to specifically identify a container, a VHD, of a CSM to which the I/O request content is to be directed. Similarly, the VHD driver and/or the VHD filter may alter an intercepted I/O request to direct the contents of the I/O request to an appropriate CSM, container, VHD, and the like. The VHD driver or the VHD filter may inspect the I/O request to determine a desired VHD destination. Inspecting is a process of identifying information associated with a packet for use in making a later determination. For example, information identified during an inspection may be used to locate a metafile or information within a metafile.

It is contemplated that the non-spanned VHD to which data was stored at the block 704 may dynamically be altered to allow for the non-spanned VHD to span two or more CSM. The ability to dynamically alter the storage structure of a container in runtime allows a greater degree of flexibility than previously recognized by static configurations. Similarly, it is contemplated that a spanned VHD may also be dynamically altered during runtime (or at any point) to become a discrete container (e.g., discrete non-spanning volume, a discrete file, etc.) on a discrete CSM (e.g., on a particular platen of a hard disk, on a particular hard disk, etc).

Figure 8:
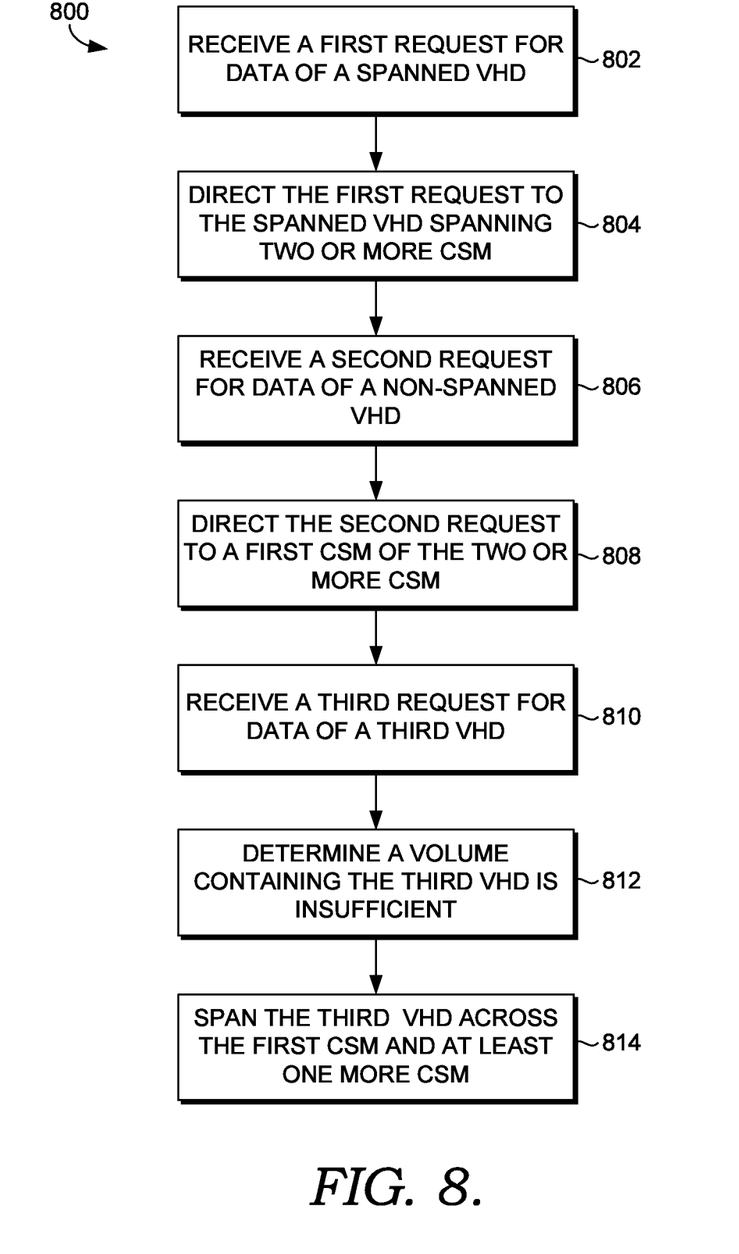
FIG. 8 depicts another method for concurrently maintaining a spanned hard virtual hard drive across two or more CSM and a non-spanned virtual hard drive on a first CSM of the two or more CSM, in accordance with embodiments of the present invention.

FIG. 8 depicts a block diagram of a method 800 for concurrently maintaining a spanned hard virtual hard drive across two or more CSM and a non-spanned virtual hard drive on a first CSM of the two or more CSM, in accordance with embodiments of the present invention. A block 802 provides a first request being received for data of a spanned VHD. In an exemplary embodiment, the first request is received at a hypervisor layer or at a host file system layer.

The request may be an I/O request from a VM residing above the hypervisor layer and the host file system layer.

At a block 804 the received first request is directed to a spanned VHD that is spanning two or more CSM. For example, the first request may be an I/O request from a VM machine attempting to access data stored in a VHD. The VM may not be aware that the VHD to which it is trying to access is spanned across two or more CSM. Further, the VM may not even be aware of where the VHD is maintained. Consequently, a VHD driver or a VHD filter may identify those attributes (e.g., where the requested data is stored and how to access the data). At a block 806 a second request is received for data of a non-spanned VHD. The second request may be received by a VHD driver or a VHD filter intercepting an I/O packet.

At a block 808, the second request is directed to a first CSM of the two or more CSM. A VHD driver or a VHD filter may direct or cause the second request to be directed to the first CSM. In an exemplary embodiment, the spanned VHD and the non-spanned VHD to which the first and second requests respectively are direct are maintained, at least in part, on a common CSM.

At a block 810, a third request for data of a third VHD is received. For example, a VHD driver or a VHD filter may intercept an I/O packet to receive the third request. The receiving entity may then determine a container (e.g., a volume) containing the third VHD is insufficient. An insufficient container may be a container that does not have sufficient space for additional data to be stored. An insufficient container may be one that does not meet a determined threshold of I/Os per unit of time. An insufficient container may be one that does not provide a threshold level of fault tolerance. This determination may be performed by a VHD driver, a VHD filter, an OS, a hypervisor, and/or any combination.

At a block 814, in response to determining the container maintaining the third VHD is insufficient, the third VHD is spanned across the first CSM and at least one additional CSM of a common node. As a result, the first CSM, in an exemplary embodiment, maintains at least a portion of a spanned VHD, a non-spanned VHD, and at least a portion of a dynamically altered VHD that spans at least one other CSM.

Additional advantages provided herein include an ability to identify VMs and/or VHDs affected by failure of one or more CSM. For example, in a traditional RAID-0 type configuration it was known that all VMs utilizing any of the CSM in a node would be affected if even one of the CSM failed. Similarly, in a static JPOD structure if a CSM is to fail, it was known which VM may have been utilizing the failed CSM. However, in a dynamically adaptable structure that allows spanned, partially spanned, and non-spanned containers to exist, it may be difficult to identify which VMs are affected by a failed CSM. The metafile may be accessed by an OS, a driver, a hypervisor, or any other components/ process to identify those VMs that may maintain data on the affected CSM.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method in a computing environment utilizing a processor and memory for concurrently maintaining 1) a spanned virtual hard drive across two or more computer-storage media ("CSM") and 2) a non-spanned virtual hard drive on a first CSM of the two or more CSM, the method comprising:

storing data of the spanned virtual hard drive across the two or more CSM utilizing volume spanning, wherein the two or more CSM are physical hard drives on a node that operates based on a host file system, the two or more CSM operate based on a host disk driver, wherein the spanned virtual hard drive is associated with one or more virtual machines accessing data in virtual hard drives; and     while the spanned virtual hard drive is maintained on the two or more CSM, storing data of the non-spanned virtual hard drive on the first CSM, wherein the non-spanned virtual hard drive does not span the two or more CSM,     wherein the non-spanned virtual hard drive is associated with the one or more virtual machines, wherein the one or more virtual machines operate based on a virtual hard drive ("VHD") driver, and     wherein Input/Output ("I/O") requests from the one or more virtual machines for data of the spanned virtual hard drive and the non-spanned virtual hard drive are processed based on communications between the VHD driver and the host disk driver via the host file system.

2. The method of claim 1 further comprising inspecting an incoming ("I/O") request in a hypervisor layer to identify which CSM of the two or more CSM maintain data associated with the I/O request.

3. The method of claim 1, further comprising inspecting an incoming ("I/O") request in the host file system to identify which CSM of the two or more CSM maintain data associated with the I/O request.

4. The method of claim 1, further comprising spanning the non-spanned virtual hard drive ("spanned non-spanned virtual hard drive") across the two or more CSM.

5. The method of claim 4, wherein the spanned virtual hard drive spans across at least one additional CSM than the spanned non-spanned virtual hard drive.

6. The method of claim 1, wherein the two or more CSM are incorporated within a common node.

7. The method of claim 1, wherein the non-spanned virtual hard drive is accessible from a discrete volume on a discrete CSM.

8. The method of claim 1, wherein volume spanning is a container on which data is stored on more than one discrete CSM while providing functionality of a single volume.

9. One or more computer-storage media having computer-executable instructions embodied thereon that, when executed by a computing system having a processor and memory, cause the computing system to perform a method for concurrently maintaining 1) a spanned virtual hard drive across two or more computer-storage medium ("CSM") and 2) a non-spanned virtual hard drive on a first CSM of the two or more CSM, the method comprising:

receiving a first request for data of the spanned virtual hard drive;

directing the first request to the spanned virtual hard drive spanning the two or more CSM, wherein the two or more CSM are physical hard drives on a node that operates based on a host file system, the two or more CSM operate based on a host disk driver, wherein the spanned virtual hard drive is associated with one or more virtual machines accessing data in virtual hard drives;

receiving a second request for data of the non-spanned virtual hard drive, wherein the non-spanned virtual hard drive is associated with the one or more virtual machines; and directing the second request to the first CSM, wherein the non-spanned virtual hard drive and the spanned virtual hard drive are both accessible, at least in part, at the first CSM substantially concurrently, wherein the one or more virtual machines operate based on a virtual hard drive ("VHD") driver, and wherein Input/Output ("I/O") requests from the one or more virtual machines for data of the spanned virtual hard drive and the non-spanned virtual hard drive are processed based on communications between the VHD driver and the host disk driver via the host file system.

10. The method of claim 9, wherein the first request is an ("I/O") request from a virtual machine operating on a host, such that the host controls the two or more CSM.

11. The method of claim 9, wherein the directing the first request is performed at a hypervisor layer of a host.

12. The method of claim 9, wherein the directing the first request is performed at a host file system layer of a host.

13. The media of claim 9, wherein the method further comprises dynamically adding a spanned volume to the first CSM, such that the first CSM maintains both spanned volumes and non-spanned volumes simultaneously.

14. The media of claim 9, wherein the method further comprises selecting a CSM from the two or more CSM onto which a volume will span, wherein the CSM is selected based on a number of virtual machines utilizing each of the two or more CSM.

15. The media of claim 9, wherein the method further comprises selecting a CSM from the two or more CSM onto which a volume will span, wherein the two or more CSM are not reconfigured to exclusively maintain spanned volumes.

16. A system for concurrently maintaining 1) a spanned virtual hard drive across two or more computer-storage medium ("CSM") and 2) a non-spanned virtual hard drive on a first CSM of the two or more CSM, the system comprising:

a host, the host comprising:
(1) a virtual machine;
(2) a virtual hard drive driver;
(3) a host file system;
(4) a first CSM maintaining both at least a portion of a spanned virtual hard drive and the entirety of a non-spanned virtual hard drive, wherein the two or more CSM are physical hard drives on a node that operates based on a host file system, the two or more CSM operate based on a host disk driver, wherein the spanned virtual hard drive is associated with one or more virtual machines accessing data in virtual hard drives; and
(5) a second CSM maintaining at least a portion of the spanned virtual hard drive and does not maintain the non-spanned virtual hard drive, wherein the non-spanned virtual hard drive is associated with the one or more virtual machines, wherein the one or more virtual machines operate based on a virtual hard drive ("VHD") driver, and wherein Input/Output ("I/O") requests from the one or more virtual machines for data of the spanned virtual hard drive and the non-spanned virtual hard drive are processed based on communications between the VHD driver and the host disk driver via the host file system.

17. The system of claim 16, wherein the VHD driver redirects I/O requests to the first CSM and the second CSM.

18. The system of claim 16, wherein the host file system comprises a VHD filter that redirects I/O requests to the first CSM and the second CSM.

19. The system of claim 16, wherein the first CSM and the second CSM dynamically adjust to include one or more additional spanned volumes and one or more non-spanned volumes.

* * * * *